United States Patent [19]

Cholat-Namy et al.

[11] 4,419,751

[45] Dec. 6, 1983

[54] MULTIPORT MODEM AND THE USE THEREOF IN A METHOD AND A SYSTEM FOR TESTING A MULTILEVEL COMMUNICATION NETWORK

[75] Inventors: Jean Cholat-Namy, Juan-Les-Pins; Simon Huon, Roquefort-Les-Pins; Philippe Thirion, Nice, all of France

[73] Assignee: International Business Machines Corp., Armonk, N.Y.

[21] Appl. No.: 315,794

[22] Filed: Oct. 28, 1981

[30] Foreign Application Priority Data

Nov. 28, 1980 [EP] European Pat. Off. ........ 80430025.9

[51] Int. Cl.³ .............................................. H04J 3/14
[52] U.S. Cl. ........................................ 370/13; 370/17
[58] Field of Search ................. 370/13, 17, 14; 375/8, 375/10

[56] References Cited

U.S. PATENT DOCUMENTS 4,055,808 10/1977 Holsinger et al. ...................... 375/8

OTHER PUBLICATIONS

"GTE's Remote Maintenance Monitor and Control System (RMCS)" by Klimowski, Proceedings of the National Electronics Conference, vol. 32; Chicago, Ill.; Oct. 16-18, 1978, pp. 308-313.

*Primary Examiner*—Douglas W. Olms
*Attorney, Agent, or Firm*—John B. Frisone

[57] ABSTRACT

A method of testing a communication network that comprises a first and a second multiport modem communicating with each other through a transmission channel, each of said modems being provided with a number of input/output interfaces and each of the interfaces on either modem being associated with a corresponding interface on the other modem. In accordance with the method of the present invention, a test request is applied to one of the interfaces on the first multiport modem, which responds thereto by generating a test configuration code identifying that interface. This modem is then caused to assume a so-called test configuration, in which only that interface to which the test request was applied is active, and a test command comprising an indication of the test to be performed and a link level identifier is applied to that interface. If the identifier designates the link level to which the first modem belongs, this modem will control the test specified in the test command. If another link level is designated, then the test command and the test configuration code will both be sent to the second multiport modem. The second modem will then decode the link level identifier and, if the link level so designated is not the one to which it pertains, will assume a test configuration such that only the interface associated with the first modem interface which received the test request will be active, and the test command will be applied to that active interface. In accordance with another aspect of the invention the test configuration code also identifies the bit rate associated with the test command. The invention also provides a test system that implements the above method. The invention further provides an improved multiport modem to be used in conjunction with the test method and system mentioned above.

17 Claims, 12 Drawing Figures

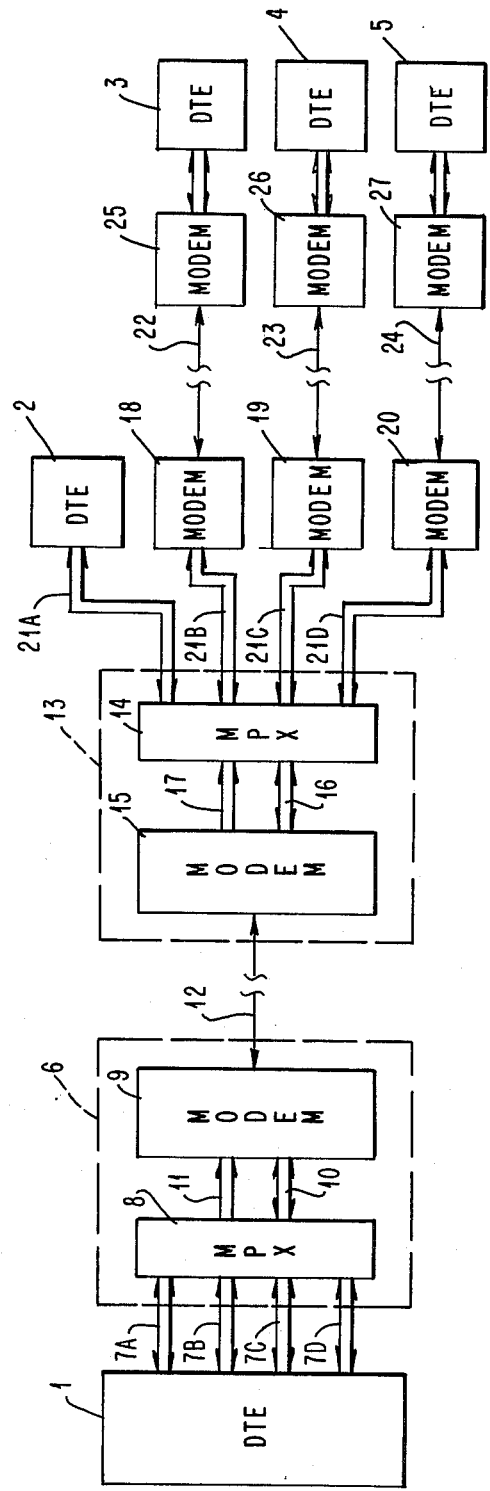

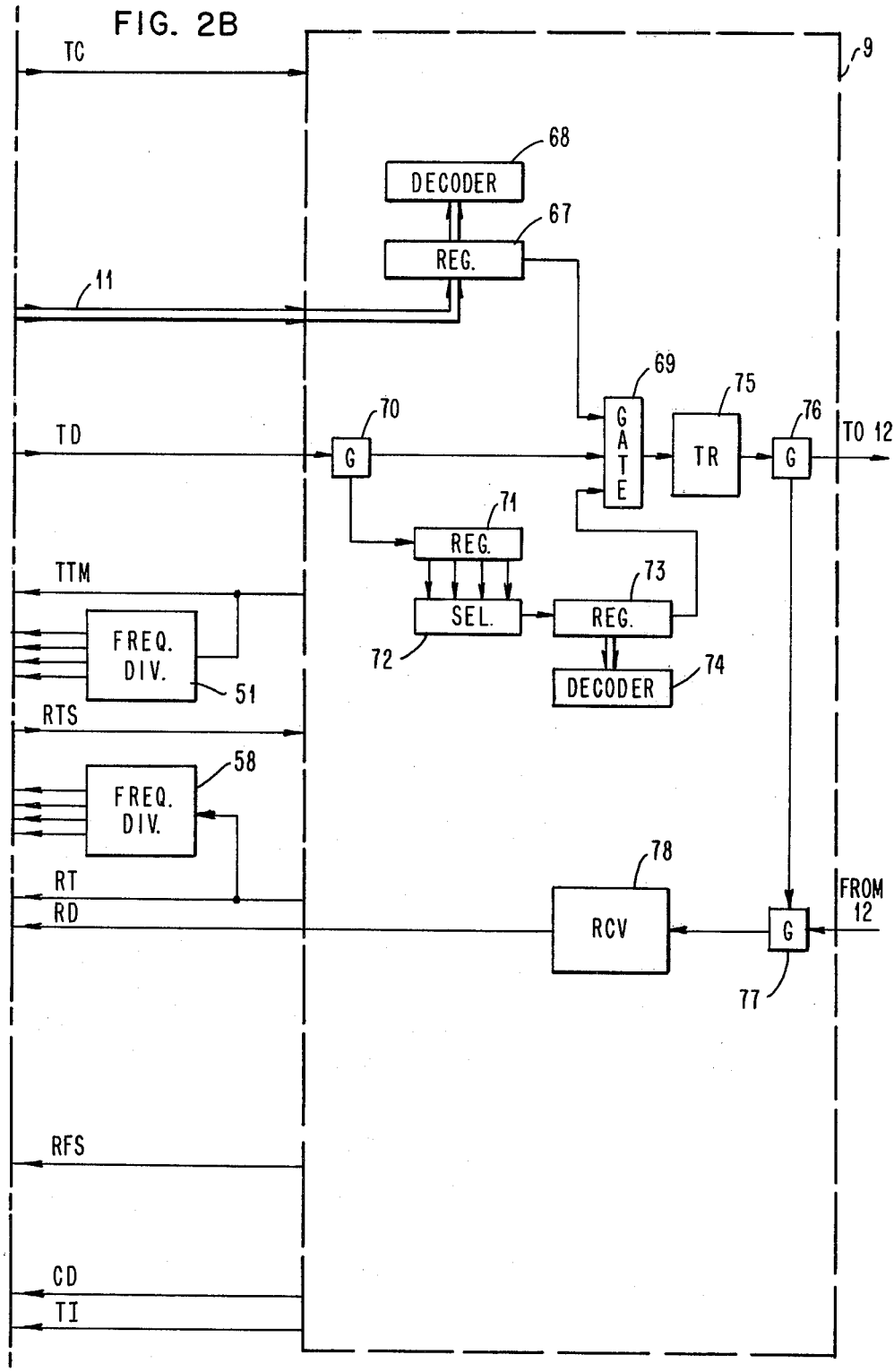

MULTIPORT MODEM AND THE USE THEREOF IN A METHOD AND A SYSTEM FOR TESTING A MULTILEVEL COMMUNICATION NETWORK

DESCRIPTION

1. Technical Field

This invention relates to systems for testing communication networks and, more particularly, to an improved multiport modem and the use thereof in a method and a system for performing selective tests of the data links in a network comprising a first-level link that includes two multiport modems communicating with each other through a transmission channel and several second-level links that are extensions of the first-level link.

2. Background Art

Because the use of more and more extensive applications and distributed data processing is considered as a way to improve the efficiency of data processing systems, the importance of having reliable data communication networks is growing day-by-day. However, as networks are becoming larger and more complex, problem determination and, more particularly, the identification of failing units are becoming increasingly difficult.

U.S. Pat. No. 4,055,808 describes a system for testing a communication network that extends over several sites. The data processing system that controls the network occupies a central site along with several central modems associated with the system. Some of these modems communicate with remote modems through an intermediate site. At the intermediate site, a modem acts as interface with the central site while an associated modem acts as interface with the remote site. Tests of the network are performed under the control of a central test unit at the central site. This unit communicates through the various modems with intermediate test units at the intermediate sites and remote test units at the remote sites. The central test unit issues test command words containing the address of the site to be tested and an indication of the test to be performed. If the address is that of an intermediate site, then the test unit at that site causes the test specified in the command to be carried out. If the address is that of a remote site connected to the intermediate site, then the test unit at the intermediate site transfers the command to the remote site. The test command words are transmitted outside the frequency band used by the modems to transmit data and each test unit includes a suitable transmitter receiver capable of transmitting and receiving the command words.

French Patent Application FR-A No. 2,408,953 describes a control system for a network comprising a communications controller to which central modems connected to remote modems are attached. Some of the remote modems are connected to second-level links through a remote communications controller. A test unit associated with each modem performs the test under the control of the central communications controller which transmits test commands thereto through a secondary channel. Each test unit includes a secondary channel transmitter/receiver. The test commands are received by the second-level link modems through a device which by-passes the remote communications controller.

The above patent and patent application illustrate the general techniques used to test communication networks that may include a large number of modems. In addition to these communication networks, there now exist medium-size networks that include so-called multiport modems such as the IBM 3865 modem. Obviously, multiport modem networks must also be tested. However, the use of the test techniques briefly described above, wherein test commands are sent via paths other than those used by the modems to transmit data and must, therefore, be processed by appropriate test units, would nullify the advantage of simplicity that is offered by multiport modem networks.

DISCLOSURE OF INVENTION

It is, therefore, an object of this invention to provide a method and a system for performing selective tests of the data links within a communication network whose first-level link consists of multiport modems, and wherein, contrary to prior art techniques, the test commands are sent via the paths used by the modems to transmit data, no separate test unit being required.

It is another object of this invention to provide an improved multiport modem adapted to the method and system of the invention.

Generally, the invention relates to a method of testing a communication network that comprises a first and a second multiport modems communicating with each other through a transmission channel, each of said modems being provided with a number of input/output interfaces and each of the interfaces on either modem being associated with a corresponding interface on the other modem. In accordance with the method of the present invention, a test request is applied to one of the interfaces on the first multiport modem, which responds thereto by generating a test configuration code identifying that interface. This modem is then caused to assume a so-called test configuration, in which only that interface to which the test request was applied is active, and a test command comprising an indication of the test to be performed and a link level identifier is applied to that interface. If the identifier designates the link level to which the first modem belongs, this modem will control the test specified in the test command. If another link level is designated, then the test command and the test configuration code will both be sent to the second multiport modem. The second modem will then decode the link level identifier and, if the link level so designated is not the one to which it pertains, will assume a test configuration such that only the interface associated with the first modem interface which received the test request will be active, and the test command will be applied to that active interface.

In accordance with another aspect of the invention, the test configuration code also identifies the bit rate associated with the test command.

The invention also provides a test system that implements the above method.

The invention further provides an improved multiport modem to be used in conjunction with the test method and system mentioned above.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 1 shows a typical configuration of two-level communication networks incorporating the invention.

FIGS. 2A and 2B illustrate an exemplary embodiment of the multiport modem 6 of FIG. 1 incorporating the invention.

DETAILED DESCRIPTION OF THE INVENTION

Figure 2A:
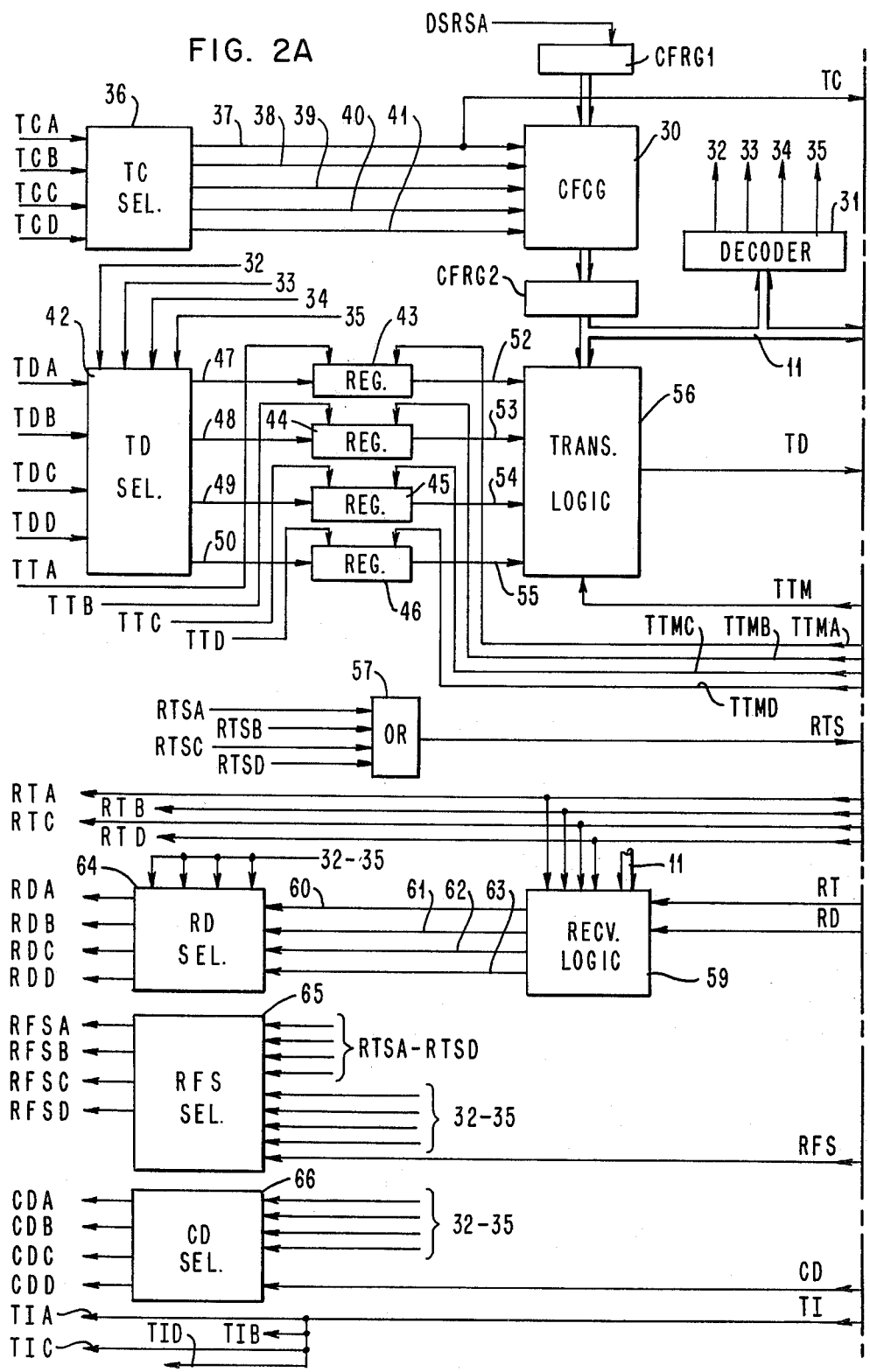

FIG. 1 illustrates a typical configuration for a two-level communication network incorporating the invention. The data terminal equipment (DTE) 1, which occupies a central site, communicates with the DTE 2 occupying an intermediate site and with three other DTEs 3, 4 and 5 which occupy remote sites. The central-site DTE 1, which may be, for example, an IBM 3705 Communications Controller, is connected to a multiport modem 6 by means of four interfaces 7A-7C of the type defined in CCITT ("Comite Consultatif International Telegraphique et Telephonique") Recommendation V24. The multiport modem 6 comprises a multiplexing device 8, which is connected to interfaces 7A-7D and, by means of a V24 interface 10 and a bus 11, to the modem section proper 9. The multiport modem 6 may consist, for example, of an IBM 3865 modem suitably modified to incorporate the invention, as shall be seen hereafter.

The multiport modem 6 is connected through a transmission channel 12 to another multiport modem 13 at the intermediate site. The modem 13 is similar to the modem 6 and comprises a multiplexing device 14 and a modem section proper 15 which are interconnected by means of a V24 interface 16 and a bus 17. The multiport modem 13, or more specifically its multiplexing device 14, is connected to the DTE 2 and to three master modems 18-20 via V24 interfaces 21A-21D. The DTE 2 and the master modems 18-20 occupy the intermediate site. The master modems 18-20 are respectively connected via transmission channels 22-24 to remote modems 25-27 which are respectively attached to the DTEs 3-5. The modems 25-27 are respectively similar to the modems 18-20 to which they are connected. The modems 18-20 and 25-27 may be, for example, IBM 3863 or IBM 3864 modems. The connection established between the multiport modems 6 and 13 is usually termed "first-level link", and each connection established between the modems 18 and 25, 19 and 26, and 20 and 27 is called a "second-level link". Those skilled in the art will realize that the network shown in FIG. 1 is merely illustrative and that, for example, the central-site DTE 1 could be replaced with four independent DTEs respectively connected to the interfaces 7A-7D.

In the data mode of operation, the central-site DTE 1 can, in conventional fashion, transmit simultaneously four data sub-channels A-D to the DTEs 2-5, respectively, through the interfaces 7A-7D, and receive simultaneously through these four interfaces the data transmitted by the DTEs 2-5. Assuming, by way of example, that each of the sub-channels A-D has a bit rate of 2400 bits per second (bps), the four sub-channels will be multiplexed together by the multiplexing device 8 to form a single train of bits to be transmitted at a bit rate of 9600 bps by the modem section 9 over the transmission channel 12. This train of bits will be received by the modem section 15 and demultiplexed by the device 14 to form four sub-channels. The sub-channel A, available at the interface 21A, will be directly fed to the DTE 2 while the sub-channels B-D, available at the interfaces 21B-21D, will be fed to the DTEs 3-5 via the modems 18-20 and 25-27, respectively. The central-site DTE 1 will receive the data sub-channels from the DTEs 2-5 in a similar fashion. The multiplexing configuration, that is, the number of active sub-channels and the bit rates associated therewith, may of course vary as indicated, for example, in CCITT Recommendation V29.

In the test mode of operation, the central-site DTE 1 controls the rest of the network in accordance with the invention and as has been briefly described above. Whenever the DTE 1 wants to test one of the data sub-channels such as sub-channel B, it sends a test request to the multiport modem 6 through the interface 7B. Upon detecting the test request, the multiport modem 6 inhibits sub-channels A, C and D and gets ready to receive a test command through the interface 7B. When the modem is ready, it signals the DTE 1 which responds by transferring thereto a test command through the interface 7B, at the bit rate the sub-channel B had last used during operation in the data mode. The test command is stored in the multiport modem 6. This command includes a link level identifier bit that indicates whether the command is intended for the first-level link, i.e. the connection between the modems 6 and 13, for the second-level link that lies beyond the sub-channel B, i.e. the connection between the modems 18 and 25.

The multiport modem 6 decodes the link level identifier bit and, if the test involves the first-level link, performs the test specified by the command and sends the test results to central-site DTE 1 through the interface 7B. If the test involves the second-level link, the multiport modem 6 sends to the multiport modem 13 the test command received from the DTE 1, using a bit rate termed "service rate", in the same manner as if the command involved the first-level link and related to the multiport modem 13, and a test configuration code specifying the sub-channel B and the transmission bit rate to be used during the test. Upon detecting the signal sent thereto at the service rate, the multiport modem 13 switches to the test mode and stores the received test command and test configuration code. It then decodes the link level identifier as relating to the second-level link and acts as a DTE with respect to that link. The multiport modem 13 inhibits sub-channels A, C and D on the interfaces 21A, 21C and 21D and transfers to the master modem 18 the test command received from the multiport modem 6. The master modem 18 inititates and performs the test specified in the command and sends the test results to the multiport modem 13 as if the latter were a DTE, and the multiport modem 13 transfers the rest results to the central-site DTE 1 through the multiport modems 6 and 13 and the interface 7B.

The invention will now be described in detail, referring initially to FIG. 2, which shows an exemplary embodiment of the multiport modem 6 incorporating the invention. Only those components which are necessary in order to understand the invention have been represented in FIG. 2.

Each of the interfaces 7A-7D and 10 comprises a number of lines which are defined in CCITT Recommendation V24 and whose names and functions are restated below for convenience:

DSRS (Bit Rate Selection): This line is used by the DTE to select the bit rate of the modem.

TD (Transmitted Data): The data originated by the DTE are transferred to the modem over this line.

TT (Transmitter Timing—DTE): The outgoing timing signals supplied by the DTE are transferred to the modem over this line.

RTS (Request to Send): This line is used by the DTE to cause the modem to assume the transmit mode.

TC (Test Command): This line is used by the DTE to cause the modem to assume the test mode.

RD (Received Data): The data received by the modem are transferred to the DTE over this line.

TTM (Transmitter Timing—Modem): The outgoing timing signals supplied by the modem are transferred to the DTE over this line.

RT (Receiver Timing): This line is used to transfer incoming timing signals to the DTE.

RFS (Ready for Sending): This line is used by the modem to signal to the DTE that it is ready to transmit.

CD (Signal Detector): This line is used by the modem to inform the DTE that the signal received from the transmission channel is within appropriate limits.

TI (Test Indicator): This line is used by the modem to signal to the DTE that it has assumed the test mode.

In FIG. 2, the abbreviations listed above are used to identify the lines of the interface 10, while the lines of the interfaces 7A-7D are identified by means of the same abbreviations to which the respective letters A-D have been added. The multiplexing device 8 comprises a configuration register CFRG1 which has a capacity of three bits. In the figure, the rightmost bit position is connected to the line DSRSA of the interface 7A and the other two bit positions are loaded, for example, from a configuration selector (not shown) located on the operator panel of the multiport modem 6. All three bit positions of the register CFRG1 are connected to a configuration code generator 30 whose output is fed to another configuration register CFRG2 comprising four bit positions connected to the bus 11. The bus 11 is connected to a decoder 31 whose four outputs are respectively connected to selection lines 32-35. The decoder 31 raises selectively one or more of the lines 32-35 in accordance with the code received via the bus 11, as shown in Table I below:

TABLE I

| Code | Lines Raised |
| --- | --- |
| 1000 | 32 |
| 1001 | 32 |
| 1010 | 32 |

TABLE I-continued

| Code | Lines Raised |
| --- | --- |
| 1011 | 33 |
| 1101 | 33 |
| 1110 | 34 |
| 1111 | 35 |
| 0001 | 32 |
| 0011 | 32, 33 |
| 0101 | 32, 33, 34 |
| 0111 | 32, 33, 34, 35 |
| 0000 | 32 |
| 0010 | 32, 33 |

The lines TCA-TCD associated with the interfaces 7A-7D are connected to a TC selection logic 36 to be described in detail with reference to FIG. 4. The logic 36 has five outputs connected via lines 37-41 to the configuration code generator 30. The line 37 is connected to the line TC of the interface 10. The lines TDA-TDD of the interfaces 7A-7D and the lines 32-35 are connected to a TD selection logic 42 to be described in detail with reference to FIG. 5 and whose four outputs are respectively connected to four elastic buffer registers 43-46 via lines 47-50. An exemplary embodiment of an elastic buffer register is described in the publication entitled "IBM Technical Disclosure Bulletin", Vol. 22, No. 10, March 1980, pp. 4597-4599. The buffer registers 43-46 are also connected respectively to the lines TTA-TTD and TTMA-TTMD. The input lines TTMA-TTMD come from a programmable frequency divider 51 which divides the frequency of the clock signals present on the line TTM associated with the interface 10 in accordance with the content of the register CFRG2 as received from the bus 11. The outputs from the elastic buffer registers 43-46 are respectively fed via lines 52-55 to a transmit logic 56 which also receives as inputs the bus 11 and the line TTM and whose output is connected to the line TD of the interface 10. The logic 56 will be described in detail with reference to FIG. 6. The lines RTSA-RTSD of the interfaces 7A-7D are connected to an OR gate 57 whose output is connected to the line RTS of the interface 10. The lines TIA-TID of the interfaces 7A-7D are connected to the line T1 of the interface 10. The line RT of the interface 10 is connected to a programmable frequency divider 58, which is similar to the frequency divider 51 and receives the bus 11, and which has four outputs respectively connected to the lines RTA-RTD of the interfaces 7A-7D. The lines RD and RT of the interface 10, the bus 11 and the lines RTA-RTD are connected to a receive logic 59, which will be described in detail with reference to FIG. 7 and whose four outputs are respectively connected to lines 60-63. The lines 60-63 and the lines 32-35 are connected to a RD selection logic 64 which is similar to the TD selection logic 42 and whose four outputs are connected to the lines RDA-RDD of the interfaces 7A-7D. The line RFS of the interface 10, the lines RTSA-RTSD and the lines 32-35 are connected to a RFS selection logic 65 which has four outputs connected to the lines RFSA-RFSD of the interfaces 7A-7D, and which will be described in detail with reference to FIG. 8. The line CD of the interface 10 and the lines 32-35 are connected to a CD selection logic 66 which has four outputs connected to the lines CDA-CDD of the interfaces 7A-7D and which will be described in detail with reference to FIG. 9.

In the modem section 9, the bus 11 is connected to a register 67, which has eight bit positions and is in turn connected to a decoder 68. The register 67 has a serial output which is connected to an input of a gate 69. The line TD is connected to the input of a gate 70 which has an output connected to another input of the gate 69 and another output connected to a test command input register 71 itself connected to a selection logic 72. The output of the selection logic 72 is connected to a test command register 73 which is in turn connected to a decoder 74 and whose serial output is connected to another input of the gate 69. The output from the gate 69 is fed to the conventional transmit circuitry, shown as block 75, of the modem. The output of the block 75 is connected to the input of a gate 76 an output from which is applied to the transmission channel 12. The signals received from the transmission channel 12 are applied to an input of a gate 77 the other input of which is connected to another output of the gate 76. The output from the gate 77 is fed to the conventional receive circuitry, shown as block 78, of the modem. The output of the block 78 is connected to the line RD. The other lines of the interface 10 are connected to the conventional interface circuitry (not shown) of the modem.

In the exemplary embodiment of FIG. 2, the sub-channels A–D may be combined in the manner shown in Table II:

TABLE II

| Overall Bit Rate | Configu- ration No. | Active Sub- channel | Bit Rate/ Sub- | Q1 | Q2 | Q3 | Q4 |
|---|---|---|---|---|---|---|---|
| 9600 | 1 | A | 9600 | X | X | X | X |
|  | 2 | A | 4800 | X |  | X |  |
|  |  | B | 4800 |  | X |  | X |
|  | 3 | A | 4800 | X |  | X |  |
|  |  | B | 2400 |  | X |  |  |
|  |  | C | 2400 |  |  |  | X |
|  | 4 | A | 2400 | X |  |  |  |
|  |  | B | 2400 |  | X |  |  |
|  |  | C | 2400 |  |  | X |  |
|  |  | D | 2400 |  |  |  | X |
|  | 5 | A | 4800 |  | X | X |  |
|  | 6 | A | 2400 |  | X |  |  |
|  |  | B | 2400 |  |  |  | X |

The bit assignment illustrated in Table II will be described later with reference to FIG. 6.

The configuration assumed by the network is stored in coded form in the register CFRG1. For example, the following codes may be used:

| CFRG1 | Configuration No. |
|---|---|
| 011 | 1 |
| 011 | 2 |
| 101 | 3 |
| 111 | 4 |
| 000 | 5 |
| 010 | 6 |

The operation of the device of FIG. 2 in the data mode will now be briefly described, it being assumed for purposes of example that the network is using configuration No. 2, in which sub-channels A and B are active and operate at a bit rate of 4800 bps each. The line DSRSA, which determines the value of the rightmost bit in the register CFRG1, is up, and the register contains the code "011." (The lines DSRSB–DSRSD are not used.) The lines TCA–TCD, 37 and TC are down and, therefore, the configuration code generator 30 forces to "0" the value of the leftmost bit in the register CFRG2 and copies the content of the register CFRG1 in the other three bit positions of CFRG2, which then contains the configuration code "0011." The lines RTSA, RTSB, RTS, RFS, RFSA and RFSB are up. The data bits of sub-channels A and B, available on lines TDA and TDB, move through the TD selection logic 42 and are loaded into the elastic buffer registers 43 and 44 at the rate defined by the clock signals on the lines TTA and TTB, respectively. The data bits are read out of the elastic buffer register 43 and 44 under the control of the clock signals present on the lines TTMA and TTMB and are applied to the transmit logic 56. The latter signals are 4800 Hz clock signals directly derived from the 9600 Hz clock signals supplied by the modem section 9 on the line TTM. The bits read out of the registers 43 and 44 are conventionally combined into four-bit groups (quadbits) in the transmit logic 56, as will be described in detail with reference to FIG. 6. The bits of every quadbit are sent over the line TD at the rate of 9600 bps determined by the signals on the line TTM. The configuration code "0011" is copied in the register 67 of the modem section 9, and the decoder 68, recognizing that the leftmost bit of this code is "0", which denotes the data mode of operation, controls the gates 69 and 70 to cause the bits present on the line TD to be fed to the transmit circuits 75 to be sent over the transmission channel 12. The gates 76 and 77 are controlled by the decoder 68 to cause the circuits 75 to be disconnected from the receive circuits 78. Since the multiport modem is not under test, the lines TI and TIA–TID are down.

At the time the multiport modem 6 receives the data bits, the lines CD, CDA and CDB are up and the lines CDC and CDD are down. The data bits received by the modem section 9 are applied through the line RD to the receive logic 59 at the rate of 9600 bps defined by the clock signals on the line RT. In the logic 59, these bits are combined into quadbits and the bits of each of these are sent over the lines 60 and 61 under the control of the content of the register CFRG2 and the 4800 Hz clock signals present on the lines RTA and RTB. The bits on the lines 60 and 61 move through the RD selection logic 64 and are applied to the central-site DTE 1 via the lines RDA and RDB, respectively.

The test of the network is initiated by the central-site DTE 1. To this end, the DTE 1 sends a test request to the sub-channel to be tested by raising the line TCA, TCB, TCC or TCD which corresponds to that sub-channel. If, for example, the sub-channel B is to be tested, the central-site DTE 1 will raise the line TCB. The TC selection logic 36 will respond by raising the line 37 (and, consequently, the line TC connected thereto) and the line 39, which is representative of the raised line TCA, TCB, TCC or TCD, and by causing the lines 38, 40 and 41, to be held to the down level.

Upon detecting the raised condition of the line 37, the configuration code generator 30 generates a test configuration code to be stored in the register CFRG2, as follows. The generator 30 forces to "1" the value of the leftmost bit in the register CFGR2, thereby specifying a test configuration code. The other three bits to be stored in the register CFGR2 are a coded representation of the sub-channel to be tested and the bit rate to be used. The generator 30 obtains the information relating to the sub-channel to be tested by determining which of the lines 38–41 is raised, and secures the information concerning the bit rate by recognizing in the content of the register CFG1 the bit rate that was last used, while in the data mode, by said sub-channel. In this example, the test configuration code generated is "1011," which means "test of sub-channel B at 4800 bps" as the following table shows:

| Code | Test Configuration |
|------|--------------------|
| 1000 | Sub-channel A - 9600 |
| 1001 | Sub-channel A - 4800 |
| 1010 | Sub-channel A - 2400 |
| 1011 | Sub-channel B - 4800 |
| 1101 | Sub-channel B - 2400 |
| 1110 | Sub-channel C - 2400 |
| 1111 | Sub-channel D - 2400 |

In response to the condition of the lines 32-35, the TD selection logic forces to the "1" level the lines 47, 49 and 50, that is, those of the lines TDA-TDD which do not correspond to the sub-channel to be tested, and the selection logics 65 and 66 cause the lines RFSA, RFSC, RFSD and CDA, CDC, CDD, respectively, to be held down.

Upon detecting the raised condition of the line TC, the modem section 9 causes the line RFS to go down. The RFS selection logic 65 then causes the line RFSB to go down. The decoder 68 decodes the test configuration code loaded in the register 67 via the bus 11, and the modem section 9 is thus informed that it is about to receive a command at 4800 bps and prepares to receive same. When ready, the modem section 9 raises the line RFS and the RFS selection logic 65 raises the line RFSB.

The central-site DTE 1 detects the raised condition of the line RFSB and transfers a test command at 4800 bps to the modem 6 via the line TDB. This test command travels through the TD selection logic 42, the elastic buffer register 44 and the transmit logic 56, and is sent over the line TD to the modem section 9 to be stored in the test command register 73 through the gate 70 controlled by the decoder 68, the register 71 and the selection logic 72. The operation of the register 71 and the selection logic 72 will be described later with reference to FIG. 6.

In the exemplary embodiment illustrated in FIG. 2, the format of the test command is that of the non-sequential, HDLC (High Level Data Link Control) frame shown below:

F, A, Control, Test Command, FCS, F which is made up of:
an 8-bit flag (F) that indicates the beginning of the frame,
an 8-bit address (A) that is the address of the receiving modem,
an 8-bit control byte that specifies a test command,
an 8-bit test command byte that specifies the test to be performed,
two 8-bit frame check sequence (FCS) bytes that enable the addressed DTE to check that the received frame is free of errors, and
an 8-bit flag (F) that signals the end of the frame.

The above format is well known. For more details, reference may be made, for example, to International Standards IS 3309 and IS 4335 as well as to the public document entitled "IBM Synchronous Data Link Control—General Information" (GA 27-3093-2).

However, the configuration of the test command byte is specific to the present invention, as noted below:
Bit 1: The bit indicates the level of the link to be tested and is set to "1" whenever the second-level link is involved.
Bits 2 to 4: Reserved for subsequent use.
Bits 5 to 8: Test bits identifying the type of test, such as:
Local modem self-test,
Remote modem self-test,
Remote/local modem status report,
Remote loop test,
Local loop test, etc.

The decoder 74 decodes the test command stored in the test command register 73.

Two cases should be considered:
FIRST CASE: The link level identifier bit is "0", thereby indicating that the test involves the first-level link; the multiport modem 6 or the multiport modem 13 or both will then perform the test specified in the command. Two examples of test are described below:

EXAMPLE 1

In this example the test command specifies a "local loop test." This corresponds to the test of the loop 3 as defined in CCITT Recommendation V54. When the command is recognized by the decoder 74, the transmit circuits 75 and the receive circuits 78 are disconnected from the transmission channel 12 and form a loop extending through the gates 76 and 77. The test command stored in the register 73 is returned to the central-site DTE 1 through the gate 69, the transmit circuits 75, the gates 76 and 77, the receive circuits 78, the line RD, the logic circuits 59 and 64 and the line RDB. The DTE 1 sends over the line TDB a test sequence which is applied via the line TD to the modem section 9, in which it travels through the transmit circuits 75 and the receive cicuits 78, and is returned to the DTE 1 via the lines RD and RDB. The sequence received by the DTE 1 via the line RDB will then be analyzed to determine whether it contains any errors. As such, this test is well known and widely used, particularly in the IBM 3863, 3864 and 3865 modems, and will not be described in greater detail. However, the present invention differs from the prior art in that the test sequence is applied to the modem through the selected interface 7B, which corresponds to the sub-channel to be tested, and is then returned to the central-site DTE 1 through the very same interface.

EXAMPLE 2

In this example the test command specifies a "remote loop test." This corresponds to the test of the loop 3 as defined in CCITT Recommendation V54. When this command is recognized by the decoder 74, the transmit circuits 75 drop the carrier for a short time interval, following which a training sequence generated by the circuits 75 and the test command stored in the register 73 are transmitted at a service rate that is relatively slow and therefore comparatively insensitive to noise, such as a rate of 1200 bps. The modem section 15 of the multiport modem 13 recognizes that the carrier has been dropped and then recognizes the training sequence and responds thereto by switching to the service rate. The received test command is stored in a register and decoded. The lines RDB' and TDB' of the multiport modem 13 that correspond to the lines RDB and TDB of the multiport modem 6 are interconnected and the test command is then returned to the central-site DTE 1 through the modem section 9, the line RD and the line RDB. (The multiport modem 13 will be described in detail with reference to FIG. 3). After it has recognized the test command, the DTE 1 generates a test sequence which is transmitted by the multiport modem 6 at the test rate, here 4800 bps, to the multiport modem 13 over the line TDB, and is then retransmitted by the multiport modem 13 by means of a loop comprised of the lines RDB' and TDB' to the multiport modem 6 and thence to the DTE 1 over the line RDB. The DTE 1 checks the received test sequence for errors. As such, this test is well known, and so is the use of a service rate (as, for example, in the IBM 3863, 3864 and 3865 modems). However, the present invention departs from the prior art in that the test configuration is applied to the multiport modem through the selected interface 7B, which corresponds to the sub-channel to be tested, and in that the remote loop is established at the selected interface 21B, which also corresponds to the sub-channel to be tested.

It will be readily apparent to those skilled in the art that all necessary tests can thus be performed at the multiport modems using selected ones of the interfaces 7A–7D and 21A–21D.

SECOND CASE: The link level identifier bit is set to "1," thereby indicating that the test involves the second-level link. After this bit value has been recognized by the decoder 74, the transmit circuits 75 drop the carrier for a short time interval and the following signals are sequentially transmitted at the service rate by the multiport modem 13: the training sequence generated by the transmit circuits 75; the first six 8-bit bytes of the test command stored in the register 73 and which are fed to the circuits 75 through the gate 69; the test configuration code which is extended to eight bits by means of zeroes in the register 67 and fed to the circuits 75 through the gate 69; and finally the last 8-bit byte of the test command stored in the register 73. The test command sent to the multiport modem 13 then has the following format:

F, A, Control, Test Command, FCD, Configuration Code, F.

The processing of this command by the multiport modem 13 will be described with reference to FIG. 3, which shows an exemplary embodiment thereof. Each of the interfaces 21A–21D comprises a number of lines as defined in CCITT Recommendation V24. In FIG. 3, the lines of the interfaces 21A–21D are identified by means of the abbreviations previously defined with reference to FIG. 2 and by adding thereto the respective suffixes A', B', C' and D', while the lines of the interface 16 are identified by means of the same abbreviations to which primes (') have been added.

The bits received from the transmission channel 12 are available at the output of the conventional receive circuits 80 of the modem section 15. The output from the circuits 80 is applied to a gate 81 an output from which is fed to one of the inputs of another gate 82. Another output from the gate 81 is applied to a test command register 83 which has a serial output connected to the other input of the gate 82. The register 83 is connected to a decoder 84 and to the bus 17.

The output from the gate 82 is applied to the input of a gate 79 whose output is connected via the line RD' of the interface 16 to a receive logic 85 which is identical to the receive logic 59 of FIG. 2. The logic 85 also receives via a bus 86 the content of a configuration register CFRG3 which has four bit positions and is loaded via the bus 17. The bus 86 is also connected to a decoder 87 whose four outputs are connected via lines 88–91 to a selection logic 92 which is similar to the RD selection logic 64 of FIG. 2 and is connected to the receive logic 85 via lines 93–96. The selection logic 92 has four outputs connected to the lines RDA'–RDD' of the interfaces 21A–21D. The line RT' of the interface 16 of FIG. 1 is connected to the receive logic 85 and to a programmable frequency divider 97 which is similar to the frequency divider 58 of FIG. 2 and is controlled by the bus 86. The frequency divider 97 has four outputs which are connected to the lines RTA'–RTD' of the interface 21A–21D. These four lines are also connected to the receive logic 85. The line CD' of the interface 16 is connected to a selection logic 98 which also receives the lines 88–91 and whose four outputs are connected to the lines CDA'–CDD' of the interfaces 21A–21D. The line TI' of the interface 16 is connected to the lines TIA'–TID' of the interfaces 21A–21D. The lines TDA'–TDD' of the interfaces 21A–21D and the lines 88–91 are connected to a selection logic 99 which is similar to the TD selection logic 42 of FIG. 2 and has four outputs connected to four elastic buffer registers 100–103 via lines 104–107. The elastic buffer registers 100–103 are respectively connected to the lines TTA'–TTD' of the interfaces 21A–21D and to lines 108–111, themselves connected to the outputs of a programmable frequency divider 112 which is similar to the frequency divider 51 of FIG. 2 and receives the line TTM' of the interface 16 and the bus 86. The outputs from the elastic buffer registers are applied to a transmit logic 113 which is identical to the transmit logic 56 of FIG. 2. The transmit logic 113 also receives the bus 86 and the line TTM' and has its output connected to the line TD' of the interface 16. The lines RTSA'–RTSD' of the interfaces 21A–21D are connected to an OR gate 114 which has its output connected to the line RTS' of the interface 16. The line RFS' of the interface 16, the lines RTSA'–RTSD' of the interfaces 21A–21D and the lines 88–91 are connected to a selection logic 115 which is similar to the selection logic 65 of FIG. 2. The output of the selection logic 115 is connected to the line RFSA' of the interface 21A. The lines RFSB'–RFSD' of the interfaces 21B–21D and the lines 88–91 are connected to a selection logic 116 which has its output connected to the line RFSO of the interface 16. In the modem section 15, the line TD' of the interface 16 is connected to the conventional transmit circuits 117 of the modem through a gate 118 another input of which is connected to an output of the gate 79. The output of the transmit circuits 117 is connected to the transmission channel 12.

The lines of the interface 21A are connected to the corresponding ports of the DTE 2, that is, the line RDA' is connected to the port RD, the line RTA' is connected to the port RT, etc. However, not all of the lines of the interfaces 21B–21D are connected to corresponding ports of the respective modems 18–20. The manner in which the lines of the interface 21B may be connected to the ports of the modem 18 is shown by way of example in FIG. 3C. The lines RTB', CDB', TIB', TTB', RTSB' and RFSB' are respectively connected to the ports TTM, RTS, TC, RT, CD and RFS. The line RDB' is connected to a gate 119 whose outputs are respectively connected to port TD of the modem 18 and to one of the inputs of a gate 1190. The gate 1190 has its output connected to the line TDB', and its other input is connected to port RD of the modem 18. The lines of the interfaces 21C and 21D are similarly connected to the ports of the modems 19 and 20.

Figure 3A:
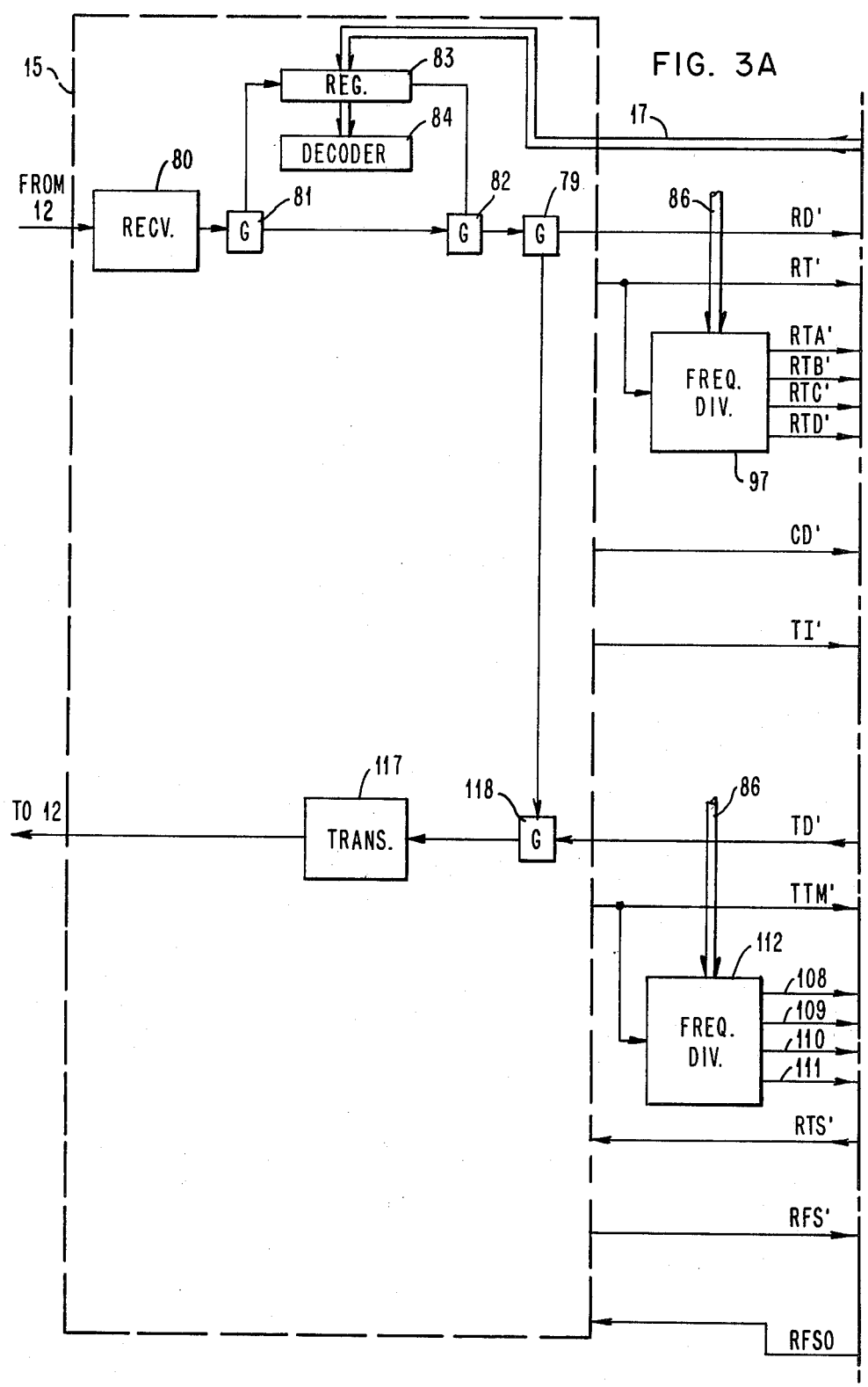
FIGS. 3A and 3B show an exemplary embodiment of the multiport modem 13 of FIG. 1 incorporating the invention.
Figure 3B:
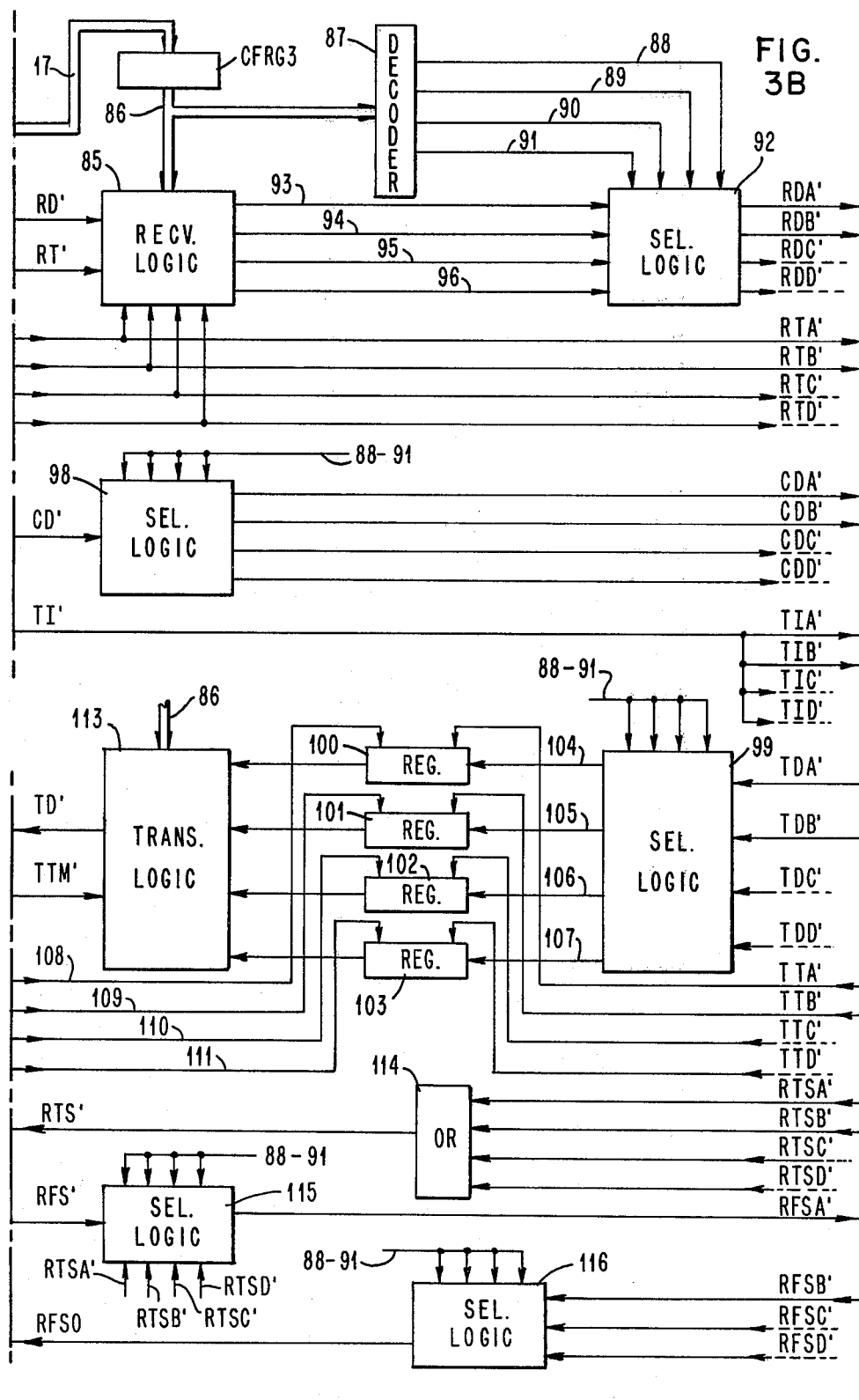
Figure 3C:
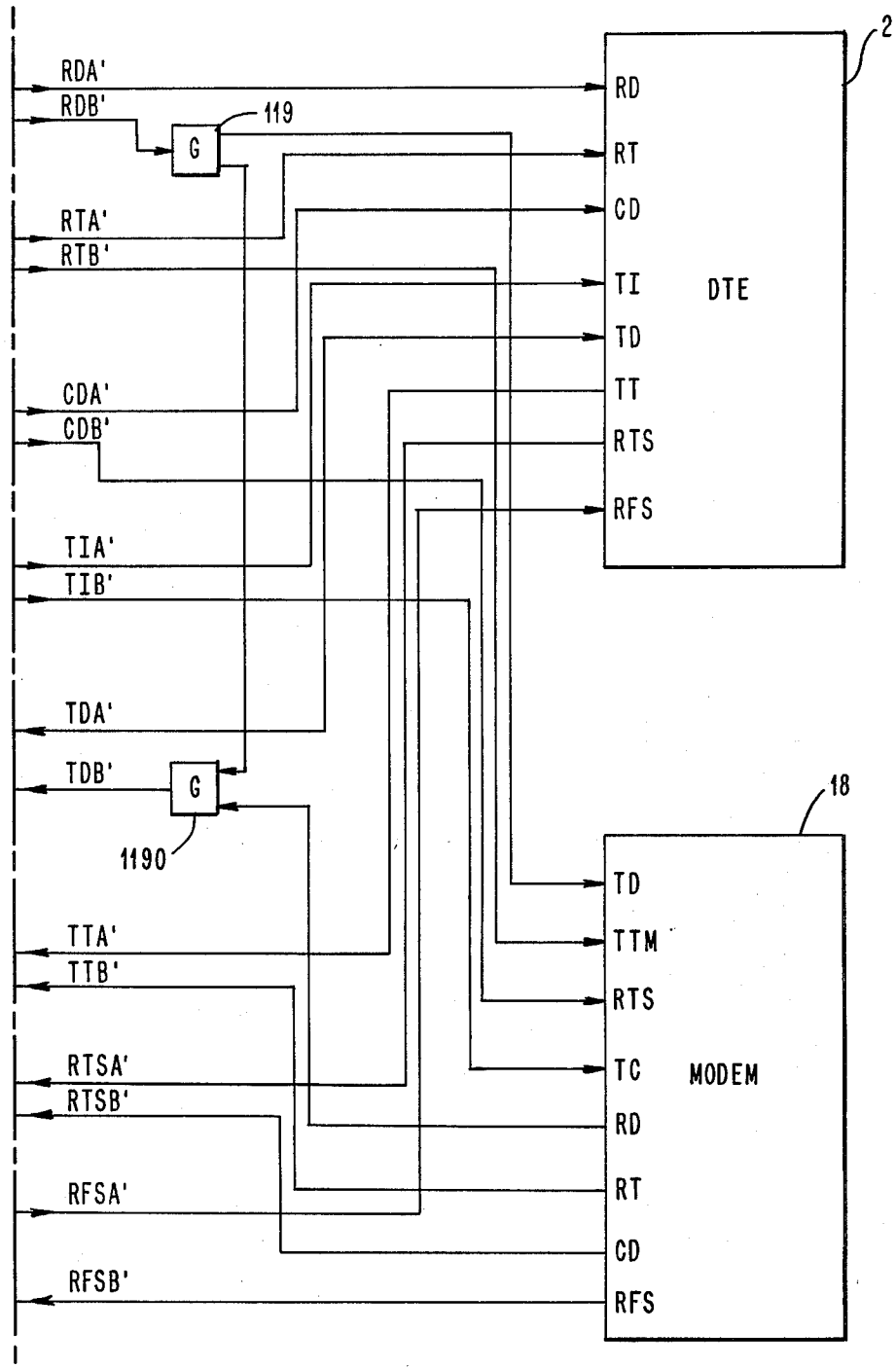
FIG. 3C illustrates the connection of a multiport modem such as is illustrated in FIGS. 3A and 3B to a Data Terminal Equipment (DTE) and to another modem.

The operation of the device of FIGS. 3A, 3B and 3C in the data mode will now be briefly described. The configuration code used by the network, which is, in this example, "0011", corresponding to configuration No. 2, is stored in the configuration register CFRG3, which operates and is loaded in the same manner as CFRG2. The lines TI', TIA', TIB', TIC' and TID' are down. The lines CD', CDA' and CDB' are up. The bits received from the transmission channel 12 are fed at a rate of 9600 bps to the receive logic 85 through the gates 81, 82, 79 and the line RD'. In the receive logic 85, the incoming bits are combined into quadbits and the individual bits are selectively transmitted over the lines 93 and 94 at 4800 bps under the control of the content of the register CFRG3 and of the clock signals present on the lines RTA' and RTB' and which are derived from those on the line RT'.

The bits present on the line 93 travel through the selection logic 92 and are fed to the intermediate-site DTE 2 via the line RDA'. The bits on the line 94 travel through the selection logic 92 and are fed via the line RDB' and through the gate 119 to port TD of the master modem 18 for transmission to the remote-site DTE 3.

The data bits sent by the DTE 2 to the central-site DTE 1 are transferred to the multiport modem 13 via the line TDA', travel through the selection logic 99 and are loaded into the elastic buffer register 100 under the control of the 4800 Hz clock signals provided by the DTE 2 over the line TTA'. The data bits sent by the DTE 3 to the DTE 1 are transmitted to the master modem 18 by the remote modem 25 and transferred from port RD of the modem 18 to the line TDB'; they then travel through the selection logic 99 and are loaded into the elastic buffer register 101 under the control of the 4800 Hz clock signals sent over the line TTB' by the master modem 18. The bits contained in the registers 100 and 101 are read out under the control of the 4800 Hz clock signals present on lines 108 and 109 and which are derived from the 9600 Hz clock signals supplied by the modem section 15 on the line TTM', and are combined into quadbits in the transmit logic 113 under the control of the content of register CFRG3. The individual bits of each quadbit are applied at the rate of 9600 Hz defined by the clock signals present on the line TTM' to the transmit circuits 117 of the modem section 15 and are then sent over the transmission channel 12 in conventional fashion.

The multiport modem 13 assumes the test mode whenever it detects a carrier drop followed by a training sequence sent at the service rate. The multiport modem 13 then switches its receive circuits to the service rate, synchronizes itself with the incoming training sequence, raises the line TI', causes the line CD' to go down and conditions the gate 81 to cause the test command that follows the training sequence to be stored in the register 83. The decoder 84 decodes the test command, beginning with the link level identifier bit. As before, two cases should be considered:

FIRST CASE: The value of the link level identifier bit is "0", thereby indicating that the test involves the first-level link. The multiport modem 13 performs the test specified in the command. Assuming, for example, that the test command specifies a "remote loop test", as in the case, described earlier, of the multiport modem 6, the decoder 84 conditions gates 79 and 118 and the command stored in the register 83 is retransmitted at the service rate to the central-site DTE 1 through the transmit circuits 117, the multiport modem 6 and the line RDB of the interface 7B.

The multiport modem 13 switches to the 4800 bps rate, and the lines TDB' and RDB' of the interface 21B are disconnected from the master modem 18 and interconnected through the gates 119 and 1190, both of which are controlled by the decoder 84. The test sequence sent by the central-site DTE 1 is received by the circuits 80 and applied to the receive logic 85 via the line RD'. It then travels through the selection logic 92, is applied to the selection logic 99 via the interconnected lines TDB' and RDB', travels through the transmit logic 113, and is sent to the central-site DTE 1 by the modem section 15 via the multiport modem 6 and the line RDB.

SECOND CASE: The link level identifier bit is "1", thereby indicating that the test relates to the second-level link. In this case, the register 83 also contains the test configuration code "1011" which is loaded via the bus 17 into the configuration register CFRG3. In response to this code, the decoder 87 raises the line 88, 89, 90 or 91 which corresponds to the sub-channel to be tested, that is, in this example, line 89 corresponding to the sub-channel B. Since the line TI' has been raised, the lines TIA'–TID' are up. Because the line TIA' is up, the DTE 2 does not participate in the test. When the line CD' is raised again, the selection logic 98, under the control of the line 89, which is the only input line that is up, causes the lines CDA', CDC' and CDD' to go down, thereby isolating the master modems 19 and 20 from the test, and raises the line CDB'.

The master modem 18 detects the raised condition of the lines TCB' and RTSB' and causes the line RFSB' to go down. When ready to receive a test command at 4800 bps on the line TDB', the master modem 18 raises the line RFSB and the selection logic 116 raises the line RFSO. The modem section 15 detects the raised condition of the line RFSO and responds thereto by transferring over the line RD' the test command stored in the register 83.

This test command travels through the receive logic 85 and the selection logic 92, and is applied to the master modem 18 via the line RDB'. The master modem 18 then performs the test specified in the command in a conventional manner (as, would be done, for example, in the case of the IBM 3863 and 3864 modems) it being understood that the command might specify a test of the modem 18 itself or of the remote modem 25 or of both modems.

The test results are supplied by the master modem 18 to the multiport modem 13 via the line TDB', travel through the logic circuits 99 and 113 and are sent to the multiport modem 6 at the service rate by the transmit circuits 117. They are then transferred to the central-site DTE 1 by the multiport modem 6 via the line RDB of the interface 7B.

Figure 4:
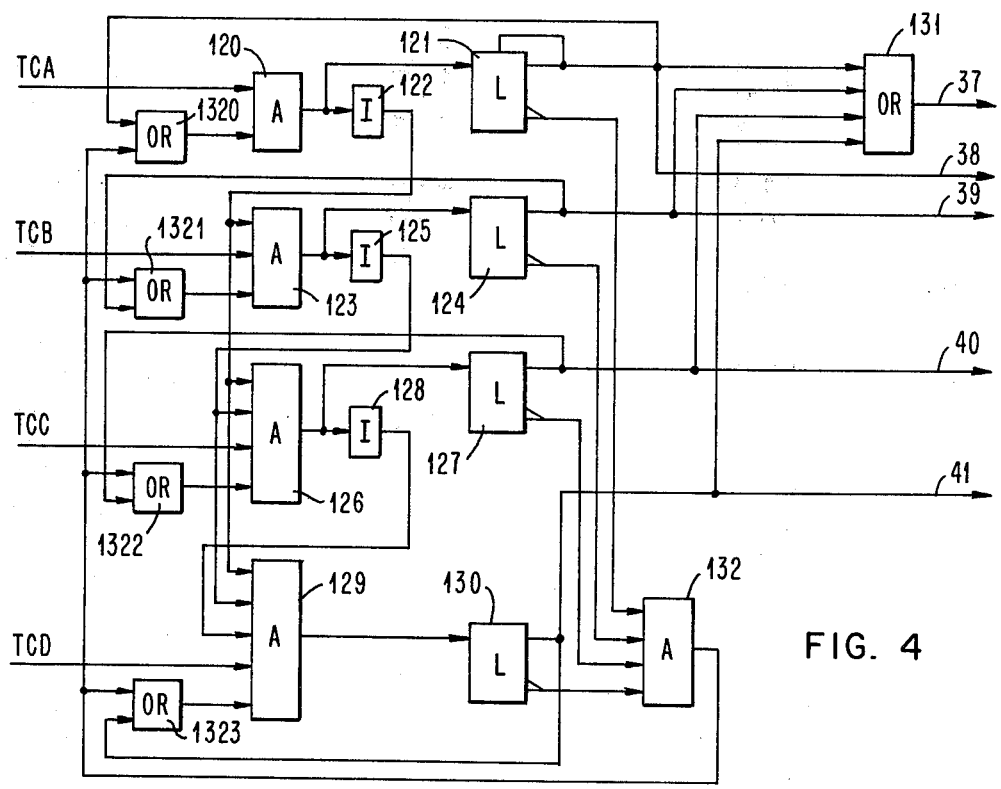
FIG. 4 shows an exemplary embodiment of the TC selection logic 36 of FIG. 2.

Referring now to FIG. 4, an exemplary embodiment of the TC selection logic 36 of FIG. 2 is shown. The line TCA is connected to one of the inputs of an AND gate 120 which has its output connected to the true input of a latch 121, whose true output is connected to the line 38. The output of the AND gate 120 is also connected through an inverter 122 to one of the inputs of an AND gate 123 which has its other input connected to the line TCB. The output of the AND gate 123 is connected to the true input of a latch 124, which has its true output connected to the line 39, and through an inverter 125 to an input of AND gate 126. The output of the inverter 122 and the line TCC are also connected to the AND gate 126 whose output is connected to the true input of a latch 127 which has its true output connected to the line 40. The output of the AND gate 126 is connected to the input of an inverter 128. The outputs of the inverters 122, 125 and 128 and the line TCD are connected to an AND gate 129 whose output is connected to the true input of a latch 130 which has its true output connected to the line 41. The true outputs of the latches 121, 124, 127 and 130 are connected to an OR gate 131 whose output is connected to the line 37. The complement outputs of the latches 121, 124, 127 and 130 are connected to an AND gate 132 which has its output connected to an input of each of four OR gates 1320–1323 whose outputs are respectively connected to the AND gates 120, 123, 126 and 129. The true outputs of the latches 121, 124, 127 and 129 are respectively connected to the other input of each of the OR gates 1320–1323.

In operation, if all of the lines TCA–TCD are down, the output of the AND gate 132 is up. If the line TCA goes up, the output of the AND gate 120, the true output of the latch 121 and the lines 37 and 38 all go up. The true output of the latch 121 being up, its complement output is down and the output of the AND gate 132 goes down, thereby holding the outputs of the AND gates 123, 126 and 129, and consequently, the lines 39–41, to the down level. The output of the AND gate 120 is held to the up level by the true output of the latch 121. The device of FIG. 4 operates in a similar manner if any one of the other lines TCB–TCD goes up. The purpose of the inverters 122, 125 and 128 is to establish priority levels so as to resolve contentions in the event of any two of the lines TCA–TCD going up simultaneously, the switching time of an inverter being less than that of a latch plus that of the AND gate 132. In the device shown in the figure, the lines TCA–TCD have decreasing levels of priority.

Figure 5:
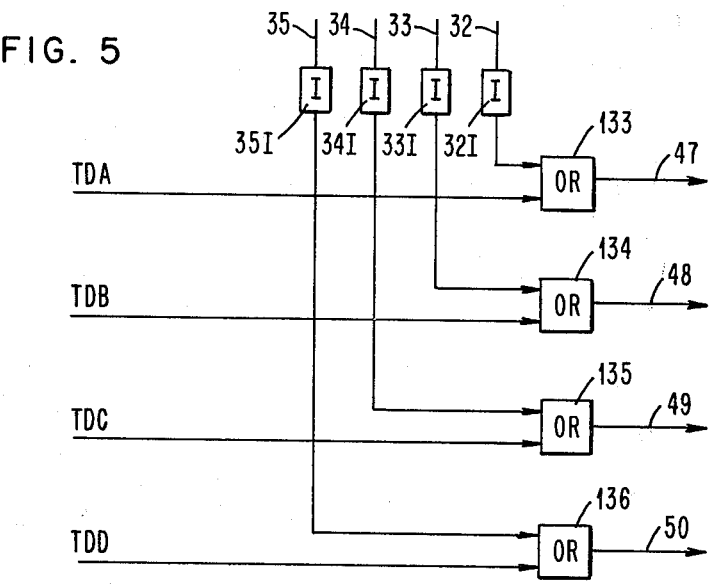
FIG. 5 shows an exemplary embodiment of the TD selection logic 42 of FIG. 2.

Referring now to FIG. 5, an exemplary embodiment of the TD selection logic 42 is shown. The line 32 is connected to an inverter 32 I whose output is connected along with the line TDA to an OR gate 133 whose output is in turn connected to the line 47. The line 33 is connected to an inverter 33 I whose output is connected along with the line TDB to an OR gate 134 whose output is in turn connected to the line 48. The line 34 is connected to an inverter 34 I whose output is connected along with the line TDC to an OR gate 135 whose output is connected to the line 49. The line 35 is connected to an inverter 35 I whose output is connected along with the line TDD to an OR gate 130 whose output is in turn connected to the line 50. In the data mode of operation, the lines 32–35 are up or down as shown in Table I and the lines TDA–TDD are respectively connected to the lines 47–50. In the test mode of operation, only one of the lines 32–35 is up, i.e., that line which corresponds to the sub-channel to be tested. For example, if the line 33 corresponding to the sub-channel B is up, then the outputs of the gates 133, 135 and 136, as well as the lines 47, 49 and 50, will be held to the up level and the bits present on the line TDB will be transferred over the line 48 through the OR gate 134. Generally, those of the lines 47–50 which do not correspond to the sub-channel to be tested will be held to the up level.

Figure 6:
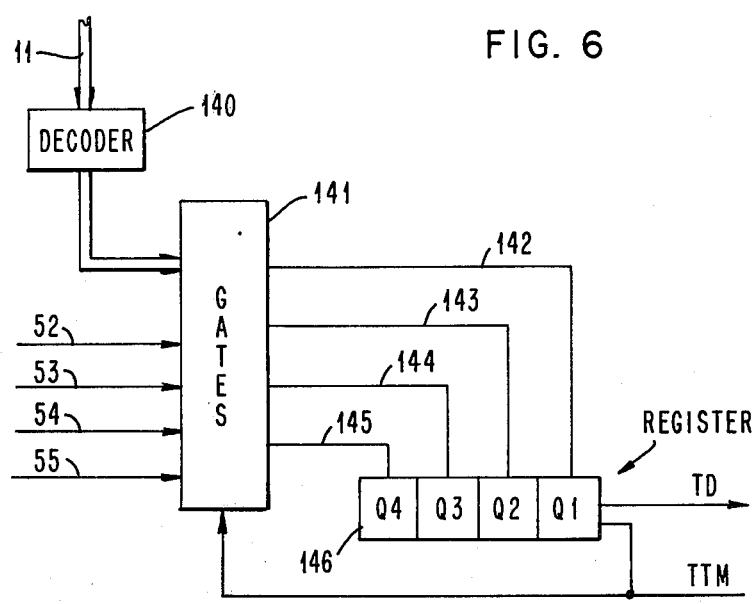
FIG. 6 shows an exemplary embodiment of the transmit logic 56 of FIG. 2.

An exemplary embodiment of the transmit logic 56 of FIG. 2 is shown in FIG. 6. The bus 11 is connected to a decoder 140 whose output is in turn connected, along with the lines 52–55, to a set of logic gates 141, which has four outputs respectively connected via four lines 142–145 to the four bit positions of a transmit register 146. The register 146 has its serial output connected to the line TD and its clock input connected to the line TTM. In the figure, the bits contained in the register 146 are designated Q1–Q4. In the data mode of operation, the decoder 140 decodes the configuration code contained in the register CFRG2 as received via bus 11, and conditions the set of gates 141 to cause the bits of the sub-channels A–D respectively received via lines 52–55 to be transferred to the transmit register 146 in accordance with Table II (previously described with reference to FIG. 2). The bits Q1–Q4 are read out of the transmit register 146 and sent over the line TD at the rate defined by the clock signals present on the line TTM. In the test mode of operation, the decoder 140 decodes the test configuration code received via bus 11 and conditions the set of gates 141 to cause the bits of the sub-channels A–D to be transferred to the transmit register 146 in accordance with Table III below:

TABLE III

| Bit Rate in Test Mode | Bit Assignment | | | |
|---|---|---|---|---|
| | Q1 | Q2 | Q3 | Q4 |
| 9600 | X | X | X | X |
| 4800 | X | X | | |
| 2400 | X | | | |

If the bit rate specified by the test configuration code is 9600 bps, the bits of the sub-channel to be tested, which bits are available on the line 52, 53, 54 or 55 corresponding to that sub-channel, are successively loaded into the four bit positions of the register 146. If the bit rate specified in the test configuration code is 4800 bps, then the bits of the sub-channel to be tested, which bits are available on the line 52, 53, 54 or 55 corresponding to that sub-channel, are successively loaded into the first two bit positions of register 146. If the specified bit rate is 2400 bps, only the first bit position of the transmit register 146 will receive the bits of the sub-channel to be tested. The quadbits read out of the transmit register 146 are loaded into the register 71 of the modem section 9 (FIG. 2), and the selection gate 72 will read out the contents of appropriate bit positions under the control of the configuration code stored in the register 67 and in accordance with Table III. For example, if the specified bit rate is 4800 bps, the selection logic 72 will successively read out the contents of the first two bit positions of the register 71 and ignore the other bit positions.

Figure 7:
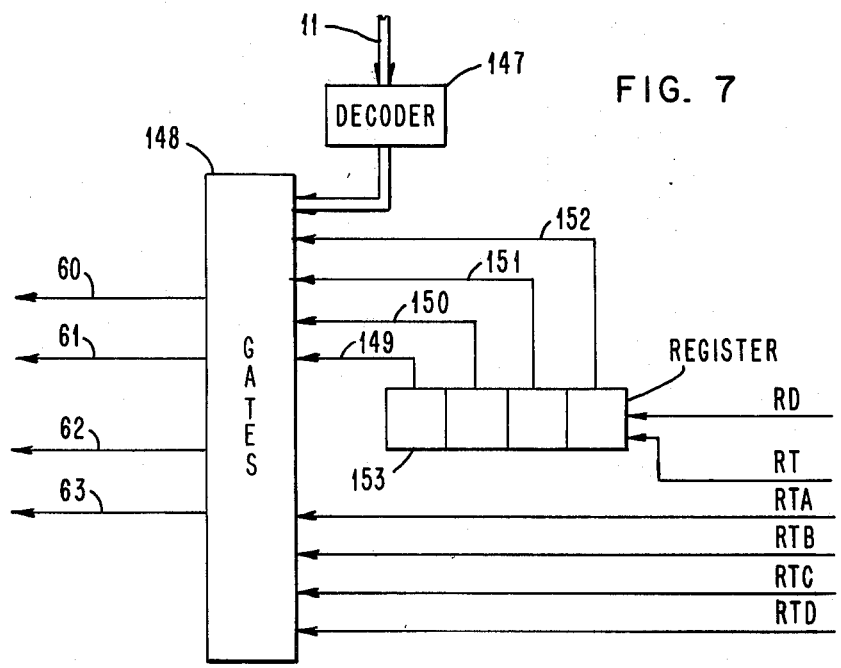
FIG. 7 shows an exemplary embodiment of the receive logic 53 of FIG. 2.

An exemplary embodiment of the receive logic 59 of FIG. 2 is shown in FIG. 7. The bus 11 is connected to a decoder 147 whose output is connected, along with the lines RTA–RTD, to a set of logic gates 148 which also receives four lines 149–152 respectively connected to the four bit positions of a receive register 153, whose serial and clock inputs are respectively connected to the lines RD and RT. The set of logic gates 148 has four outputs which are respectively connected to the lines 60–63. It will be appreciated by those skilled in the art that the operation of the receive logic is the reverse of that of the transmit logic shown in FIG. 6. The bits of each of the quadbits stored in the receive register 153 are selectively transferred from the set of gates 148 via the lines 60-63 under the control of the decoder 147 and the clock signals present on the lines RTA-RTD.

Figure 8:
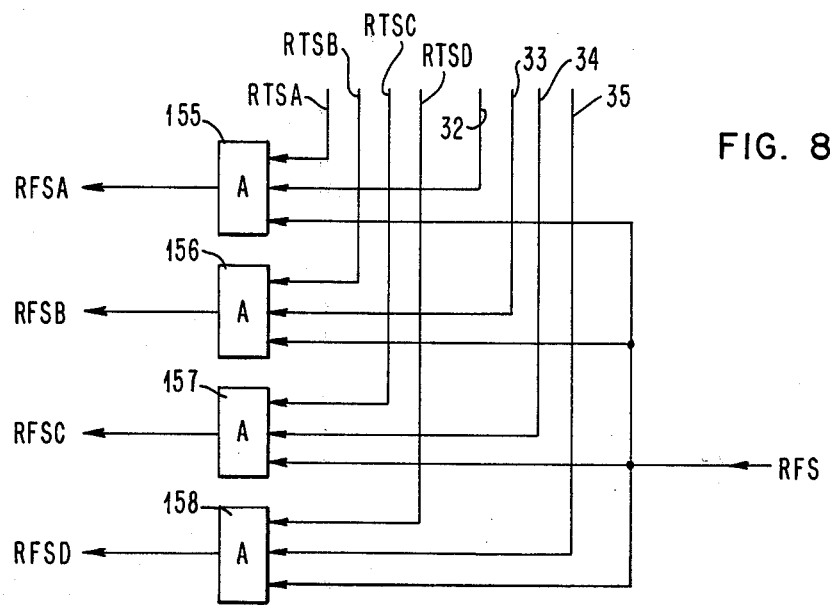
FIG. 8 shows an exemplary embodiment of the RFS selection logic 65 of FIG. 2.

An exemplary embodiment of the RFS selection logic 65 of FIG. 2 is shown in FIG. 8. The lines RFS, RTSA and 32 are connected to an AND gate 155 which has its output connected to the line RFSA. The lines RFS, RTSB and 33 are connected to an AND gate 156 which has its output connected to the line RFSB. The lines RFS, RTC and 34 are connected to an AND gate 157 whose output is connected to the line RFSC. The lines RFS, RTD and 35 are connected to an AND gate 158 whose output is connected to the line RFSD. In operation, when the line RFS is down, all of the lines RFSA-RFSD are down. When the line RFS is up, it is necessary, in order for any one of the lines RFSA-RFSD to be up, that both the corresponding line RTSA, RTSB, RTSC or RTSD and the corresponding line 32, 33, 34 or 35 be up.

Figure 9:
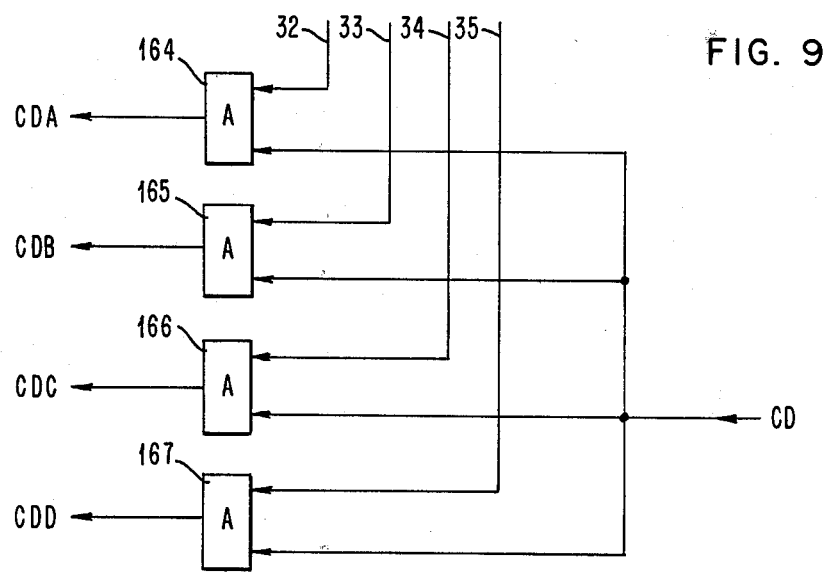
FIG. 9 shows an exemplary embodiment of the CD selection logic 66 of FIG. 2.

An exemplary embodiment of the CD selection logic 66 of FIG. 2 is shown in FIG. 9. The lines 32 and CD are connected to an AND gate 164 which has its output connected to the line CDA. The lines 33 and CD are connected to an AND gate 165 which has its output connected to the line CDB. The lines 34 and CD are connected to an AND gate 166 which has its output connected to the line CDC. The lines 35 and CD are connected to an AND gate 167 which has its output connected to the line CDD. If the line CD is down, then all of the lines CDA-CDD are down. If the line CD is up, then the lines CDA-CDD are selected in the following manner, depending on whether the modem operates in the data mode or in the test mode.

In the data mode of operation, the lines 32-35 are up or down as shown in Table I and only those of the lines CDA-CDD that correspond to those of the lines 32-35 which are up, will themselves be up. In the test mode, only one of the lines 32-35, say line 33, is up, and if the line CD is up, then the line CDB will be up and the lines CDA, CDC and CDD will be down.

While the invention has been particularly shown and described with reference to a preferred embodiment thereof, it will be understood by those skilled in the art that numerous changes in form and detail may be made therein without departing from the spirit and scope of the invention.

Having thus described our invention, what we claim as new, and desire to secure by Letters Patent is:

1. A multiport modem suitable for use in a multilevel link and of the type comprising several input/output interfaces (7A-7D) that may respectively receive the bits of several data sub-channels, multiplexing means (42, 43-46, 56) for multiplexing together the data bits received through those of the interfaces which are active to form a single train of bits in accordance with a multiplexing configuration, and transmitter means (75) for sending said train of bits over a transmission channel, characterized in that it includes:

means (36) for detecting a test request received from one of the interfaces, means (30) responsive to a test request to generate a test configuration code for identifying the interface that supplied said test request, means (11) responsive to said test configuration code to cause said multiplexing means to assume a test configuration such that only that interface which received the detected test request will be active, storage means (73) for storing a test command received at the interface that received the test request, said command including an indication of the test to be performed and a link level identifier, decoder means (74) for decoding said link level identifier, and means (67, 73) for applying the received test command and the test configuration code to said transmitter means for transmission over said channel if said link level identifier indicates a link level other than that which includes the modem.

2. A multiport modem according to claim 1, characterized in that it includes means (9) for controlling the test specified in the test command if the link level indicated by the link level identifier includes the modem.

3. A multiport modem according to claim 1 or 2, characterized in that the test configuration code further identifies the bit rate associated with the test command.

4. A multiport modem according to claim 3 and of the type that includes receiver means (78) for receiving signals from the transmission channel and converting them into a single train of bits, and demultiplexing means (59-64) for demultiplexing said train of bits to form a number of sub-channels equal to the number of active interfaces and applying same to said active interfaces, in accordance with a multiplexing configuration, characterized in that said demultiplexing means are caused to assume a test configuration in accordance with a received test configuration code, and in that the results of the test specified in a received test command are provided by the modem to the interface that received the test request.

5. A multiport modem of the type including several input/output interfaces (21A-21D) that can respectively receive the bits of several data sub-channels, receiver means (80) for receiving the signals from a transmission channel and converting them to a single train of bits, and demultiplexing means (85, 92) for demultiplexing said train of bits to form a number of data sub-channels equal to the number of active interfaces and applying same to said active interfaces, in accordance with a multiplexing configuration, characterized in that it includes:

means (83) for storing a test command received from the transmission channel, said command including an indication of the test to be performed, a link level identifier, and, when the latter identifies a link level other than that which includes the modem, a test configuration code identifying one of the interfaces, means (86; 87) for causing said demultiplexing means to assume, in accordance with the test configuration code received, a test configuration such that only the particular interface identified by said configuration code will be active, decoder means (84) for decoding the link level identifier, and means (84, 85, 92) for applying the test command to the interface identified by the configuration code when the link level identifier indicates a link level other than that which includes the modem.

6. A multiport modem according to claim 5, characterized in that it includes means (14) for controlling the test specified in the test command when the link level identifier designates the link level that includes the modem.

7. A multiport modem according to claim 5 or 6, characterized in that the test configuration code also identifies the bit rate to be used to apply the test command to the interface identified by the configuration code.

8. A multiport modem according to claim 5 and of the type that includes multiplexing means (99, 100-103, 113) for multiplexing together the data bits received through the active interfaces so as to form a single train of bits, in accordance with a multiplexing configuration, and transmitter means (117) for sending said single train of bits over the transmission channel, characterized in that said multiplexing means are caused to assume a test configuration in accordance with the test configuration code received, and in that the results of the test specified in the test command are received at the interface identified in the test configuration code and sent over the transmission channel by said transmitter means.

9. A method of testing a network having a first and a second multiport modem communicating with each other through a transmission channel, each of said modems including several input/output interfaces, and each of the interfaces at either multiport modem being associated with one of the interfaces at the other modem, characterized in that it includes the steps of:
  applying a test request to one of the interfaces at the first multiport modem,
  generating a test configuration code identifying the interface to which the test request has been applied,
  causing the first multiport modem, in response to the receipt of the test request by said first multiport modem, to assume a test configuration such that only the particular interface to which the test request has been applied will be active,
  applying to the interface which received the test request a test command including an indication of the test to be performed and a link level identifier,
  decoding the link level identifier,
  transmitting to the second multiport modem over the transmission channel the received test command and the test configuration code, when the link level indicated by the link level identifier is not the one which includes the first multiport modem, and
  in the second multiport modem, decoding the link level identifier included in the received test command and when it indicates a link level other than that which includes the second multiport modem, causing the second multiport modem to assume a test configuration such that only the interface associated with the interface which received the test request at the first multiport modem will be active, and applying the test command to said associated interface.

10. A method according to claim 9, characterized in that the test configuration code further identifies the bit rate for the test command.

11. A method of testing a network including a first and a second multiport modem communicating with each other through a transmission channel, the first multiport modem including a plurality of input/output interfaces (7A-7D) which can respectively receive the bits of several data sub-channels, multiplexing means (42, 43-46, 56) for multiplexing together the data bits received through those of the interfaces which are active so as to form a first train of bits, in accordance with a multiplexing configuration, and transmitter means (75) for sending said train of bits over the transmission channel, and the second multiport modem including a plurality of input/ouput interfaces (21A-21D) each of which is associated with one of the interfaces on the first multiport modem, receiver means (80) for receiving signals from the transmission channel and for converting same into a second train of bits, and demultiplexing means (85, 92) for demultiplexing said train of bits to form a number of data sub-channel equal to the number of active interfaces and for applying them to its active interfaces, in accordance with the multiplexing configuration, characterized in that it includes performing the following steps:
  in the first multiport modem,
    detecting a test request from one of the interfaces,
    responsive to the detection of a test request generating a test configuration code identifying the interface which provided the test request,
    responsive to the test configuration code placing said multiplexing means in a test configuration such that only that interface which received the detected test request will be active,
    storing a test command received from the interface which received the test request, said command including an indication of the test to be performed and a link level identifier,
    decoding the stored link level identifier, and
    applying the test command and the test configuration code to said transmitter means for transmission over the transmission channel when the link identifier indicates a link level other than that link which includes said first and second multiport modems,
  and in the second multiport modem:
    storing the test command and the test configuration code received from the transmission channel,
    responsive to the stored test command and configurating placing said demultiplexing means in a test configuration such that only the interface associated with the interface which received the test request at the first multiport modem will be active, and
    applying the test command to said active interface when the link level identifier indicates a link level other than that which includes said first and second multiport modems.

12. A system for testing a network including a first and a second multiport modem communicasting with each other through a transmission channel, the first multiport modem including several input/output interfaces (7A-7D) which can respectively receive the bits of several data sub-channels, multiplexing means (42, 43-46, 56) for multiplexing together the data bits received through those of the interfaces which are active so as to form a first train of bits, in accordance with a multiplexing configuration, and transmitter means (75) for sending said train of bits over the transmission channel, and the second multiport modem including several input/output interfaces (21A-21D) each of which is associated with one of the interfaces on the first multiport modem, receiver means (80) for receiving signals from the transmission channel and for converting same into a second train of bits, and demultiplexing means (85, 92) for demultiplexing said train of bits to form a number of data sub-channels equal to the number of active interfaces and for applying them to its active interfaces, in accordance with the multiplexing configuration, characterized in that it includes:
  in the first multiport modem,
    means (36) for detecting a test request from one of the interfaces, means (30) responsive to the detection of a test request to generate a test configuration code identifying the interface which provided the test request, means (11) responsive to the test configuration code to cause said multiplexing means to assume a test configuration such that only that interface which received the detected test request will be active, first storage means (73) for storing a test command received from the interface which received the test request, said command including an indication of the test to be performed and a link level identifier, first decoder means (74) for decoding the link level identifier, and means (67, 73) for applying the test command and the test configuration code to said transmitter means to be sent over the transmission channel if the link level identifier indicates a link level other than that which includes said first and second multiport modems, and in the second multiport modem:

means (83) for storing the test command and the test configuration code received from the transmission channel, means (86, 87) for causing said demultiplexing means to assume, in accordance with the received test configuration code, a test configuration such that only the interface associated with the interface which received the test request at the first multiport modem will be active, and means (84, 85, 92) for applying the test command to said active interface if the link level identifier indicates a link level other than that which includes said first and second multiport modems.

13. A system according to claim 12 and in which the second multiport modem includes multiplexing means (99, 100-103, 113) for multiplexing together the data bits received through the active interfaces to form a single train of bits, in accordance with a multiplexing configuration, and transmitter means (117) for sending said single train of bits over the transmission channel, characterized in that the multiplexing means are caused to assume a test configuration in accordance with the test configuration code, and in that the results of the test specified in the test command are received at the interface identified by the test configuration code and sent over the transmission channel by said transmitter means.

14. A system according to claim 12, characterized in that it includes means (9, 14) for controlling the test specified in the test command if the link level indicated by the link level identifier includes the first and second multiport modems.

15. A system according to any one of claims 12, 13 or 14 characterized in that the configuration code identifies the bit rate associated with the test command.

16. A multiport modem according to any one of claims 1 or 2 and of the type that includes receiver means (78) for receiving signals from the transmission channel and converting them into a single train of bits, and demultiplexing means (59-64) for demultiplexing said train of bits to form a number of sub-channels equal to the number of active interfaces and applying same to said active interfaces, in accordance with a multiplexing configuration, characterized in that said demultiplexing means are caused to assume a test configuration in accordance with a received test configuration code, and in that the results of the test specified in a received test command are provided by the modem to the interface that received the test request.

17. A multiport modem according to claim 7 and of the type that includes multiplexing means (99, 100-103, 113) for multiplexing together the data bits received through the active interfaces so as to form a single train of bits, in accordance with a multiplexing configuration, and transmitter means (117) for sending said single train of bits over the transmission channel, characterized in that said multiplexing means are caused to assume a test configuration in accordance with the test configuration code received, and in that the results of the test specified in the test command are received at the interface identified in the test configuration code and sent over the transmission channel by said transmitter means.

* * * * *